United States Patent [19]

Tabacchi et al.

[11] Patent Number: 4,615,086
[45] Date of Patent: Oct. 7, 1986

[54] METHOD OF MANUFACTURING FRONT PIECES FOR EYEGLASS FRAMES

[76] Inventors: Vittorio Tabacchi; Vincenzo Viel, both of VII Strada, n.20, Padova, Italy

[21] Appl. No.: 679,933

[22] Filed: Dec. 10, 1984

[51] Int. Cl.$^4$ .................. B21D 33/00; B21D 53/40
[52] U.S. Cl. .............................. 29/20; 29/11
[58] Field of Search ................... 29/412–418, 29/11, 20

[56] References Cited
U.S. PATENT DOCUMENTS

| | | | |
|---|---|---|---|
| 651,284 | 6/1900 | West | 29/20 |
| 1,453,632 | 5/1923 | McKinstry et al. | 29/20 |
| 2,053,344 | 9/1936 | Lustig | 29/11 |
| 4,485,544 | 12/1984 | Van Ryswyk | 29/11 |

Primary Examiner—Howard N. Goldberg
Assistant Examiner—Steven Nichols
Attorney, Agent, or Firm—Howard I. Schuldenfrei

[57] ABSTRACT

An article of manufacture and the method of manufacturing front pieces for eyeglass frames having formed integrally therein a nose for connecting temple pieces to the front piece of the frame which comprises cutting from a strip a semi-finished product comprising a front piece with lens rims which are provided on the outermost part of each of them, with an appendage which is integral with the corresponding rim and extends outward therefrom; the appendages are then drilled and bent so as to form corresponding box-shaped bodies, each constituting a nose for the temple piece of the eyeglasses.

4 Claims, 6 Drawing Figures

METHOD OF MANUFACTURING FRONT PIECES FOR EYEGLASS FRAMES

BACKGROUND OF THE INVENTION

The present invention relates to a method of manufacturing eyeglass frames having a front piece comprising a pair of lens-bearing rims, and, on the outermost side of each of them, a nose for the hingeing of a temple piece, which noses are integral with the corresponding lens rim.

The most critical point in eyeglass frames, and in particular in flexible eyeglass frames, consists of the connection between the front piece of the frame and the temple pieces. This connection is effected at a place commonly known in the industry as a "nose".

In most cases, the noses are connected to the outermost parts of the respective lens-bearing rims of the eyeglass frame by welding, brazing or similar procedures involving the action of heat on the lens rim.

This results in a local weakening of the lens rim and therefore in the possibility of permanent deformations or breaks thereof in one of its most stressed zones, namely at the place of attachment of the nose.

Some known solutions directed at obviating these drawbacks consist of noses which can be fitted by mortising or clamping to the lens-bearing rims.

For this purpose, the known method proposed for the manufacture of an eyeglass frame contemplates separate production of the lens rims and the parts integral with them and a subsequent phase of attachment of the noses produced with separate machines and on separate lines.

This solution, although obviating the drawback of weakening of the rim in the region of attachment of the nose, has numerous drawbacks, including primarily the fact that, in view of the small size of the nose and the necessity of accurate connections, the production of the nose and of the corresponding rim is subject to very close tolerances; furthermore, as there is concerned a part which is separate from the lens rim and subsequently fastened to it, problems of loss of rigidity in the nose-rim connection can arise in time, with a consequent loss of the effectiveness of the eyeglass frame.

The necessity of producing the noses separately from the remaining parts of the front piece substantially impairs the economy of the production of the frames, both because of the aforementioned different lines of production and machines and because of the need of an additional step of assembling the noses to the lens rims.

The technical problem forming the basis of the present invention is to create a method of manufacturing front pieces for eyeglass frames which overcomes the above-mentioned drawbacks of the prior art.

SUMMARY OF THE INVENTION

In general, the idea for the solution of this problem consists in producing the nose integral with the corresponding lens rim. More particularly, the method of the invention is characterized by the fact that it comprises the following steps:

cutting from a strip a semi-finished article comprising a front piece with lens rims which are provided on the outermost part of each of them with an appendage which is integral with the corresponding rim and extends outward from it, said rims and corresponding appendages being symmetrical to a central transverse axis of the front piece and the appendage being aligned and opposite each other along a longitudinal axis of the said front piece;

bending each appendage along lines parallel to the longitudinal axis of the front piece and forming a pair of spaced cheeks substantially parallel to each other and extending in the same direction at a right angle to the plane of the front piece;

bending each appendage along a line substantially parallel to the transverse axis of the front piece so as to form a box-shaped body constituting a nose of the eyeglasses.

Each of said appendages is advantageously provided with a substantially central slit which includes the corresponding rim and is substantially parallel to the longitudinal axis of the front piece.

BRIEF DESCRIPTION OF THE DRAWING

The characteristics and advantages of the invention will be more evident from the detailed description of an eyeglass frame and the sequence of manufacturing steps for the obtaining thereof, given by way of illustration and not of limitation which reference to the accompanying drawings, in which.

DETAILED DESCRIPTION OF THE INVENTION

Figure 1:
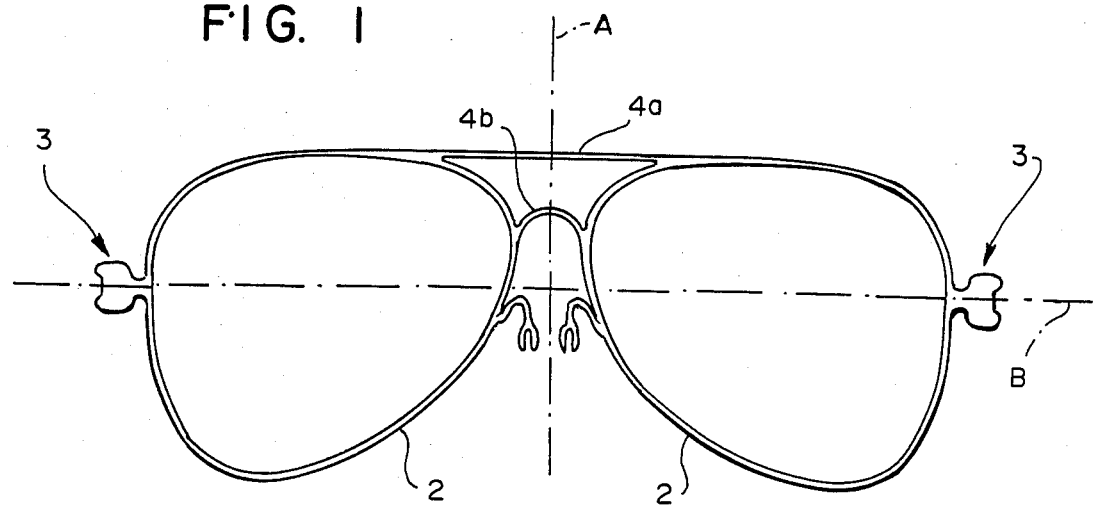
FIG. 1 is a plan view of a semi-finished front piece for eyeglass frames in accordance with the invention.
Figure 2:
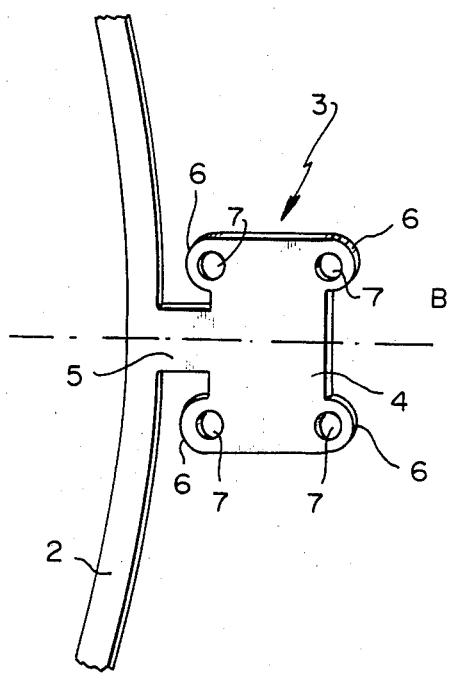
FIGS. 2 to 6 show in persepective a detail of the front piece of FIG. 1 in successive stages of manufacture for the obtaining of an eyeglass frame.

The method according to the invention comprises a first operation of cutting from a strip, which is carried out in accordance with known methods such as, for instance, cutting with shears or by use of a laser beam, a semi-finished substantially flat front piece of the type shown in FIG. 1, indicated generally by the reference number 1.

The front piece 1 is cut out from a strip of suitable material such as, for instance, stainless spring steel, and has a pair of lens-bearing rims, both indicated by 2, connected by bridges 4a and 4b and provided, on the outermost part of each rim, with a corresponding appendage 3 which is integral with the corresponding rim.

The rims 2 and corresponding appendages 3 are symmetrical with respect to a central transverse axis A of the front piece 1, and the said appendages are aligned and opposite each other on a longitudinal axis B of the front piece which is perpendicular to the axis A.

Each appendage 3 comprises a widened portion 4 spaced from and attached to the corresponding rim 2 by a bridge portion 5.

The widened portion 4 has a substantially quadrilateral shape with rounded lugs 6 at its corner which extend opposite each other on lines parallel to the axis B.

Each lug 6 is traversed by a hole 7, the function of which will become clear from the following description.

Figure 3:
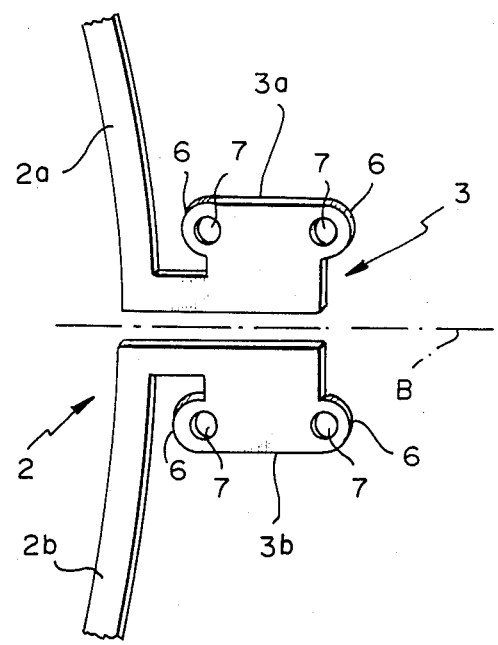
Figure 4:
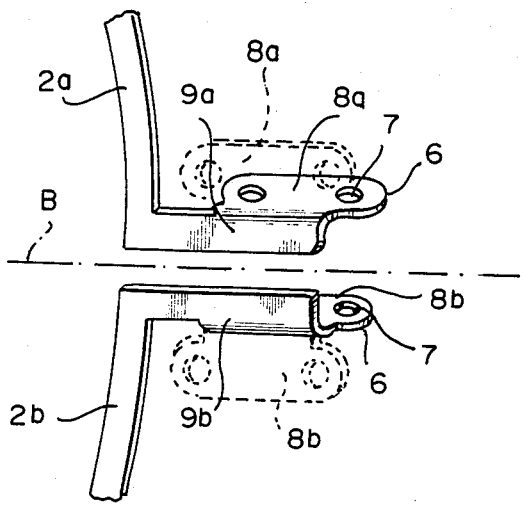

The production of the eyeglass front piece of the invention contemplates a further phase of cutting the appendages 3 with a cut parallel to the longitudinal axis B, substantially centrally in the said appendages and including the corresponding rim, as shown in FIG. 3.

The rim 2 is thereby subdivided into a pair of branches 2a, 2b, with each of which there is integral a corresponding portion 3a, 3b of the appendage 3.

The portions 3a, 3b are symmetrically opposite each other with respect to the axis B.

A subsequent stage of manufacture contemplates bending each of the portions 3a, 3b at a right angle along a line substantially parallel to the longitudinal axis B of the front piece 1 in order to form corresponding cheeks 8a, 8b and corresponding backs 9a, 9b.

At the end of this stage of manufacture, a half-back 9a (and 9b respectively) extending in the plane of the front piece, and a cheek 8a, 8b extending in the same direction at right angles to the plane of the front piece, are therefore integral with the end of each branch 2a, (2b) of the rim 2.

Figure 5:
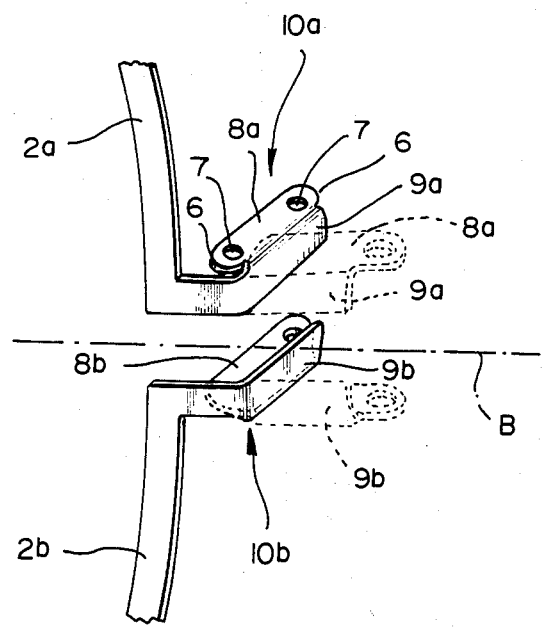
Figure 6:
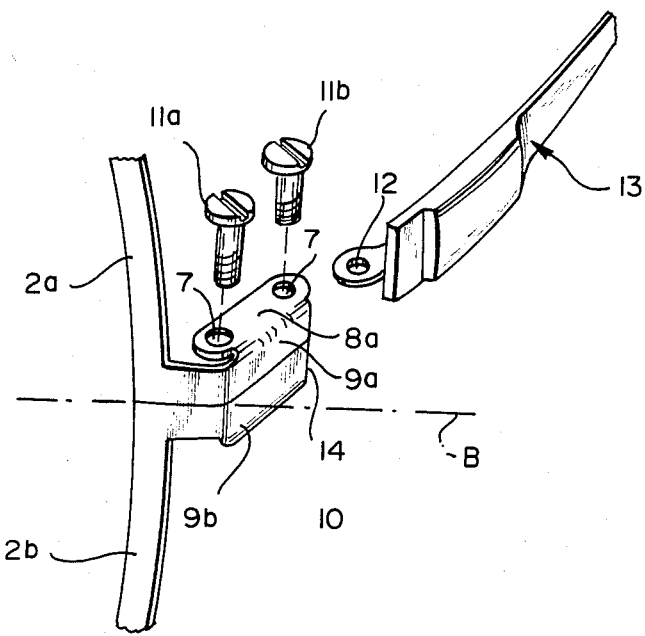

Referring to FIG. 5, the half-backs 9a, 9b are then bent in the same direction along a line substantially perpendicular to the longitudinal axis B in the plane of the front piece so as to form two half-noses 10a, 10b.

Corresponding holes 7 of the respective cheeks 8a, 8b are arranged in coaxial alignment and are then traversed by a pair of screws 11a, 11b.

The screw 11a on the part closest to the rim 2 clamps the two half-noses 10a, 10b together as well as the corresponding branches of the rim 2; the screw 11b acts as hinge pin for an eye lug 12 fastened to one end of a temple piece 13 of the eyeglass frame.

There is thus obtained a nose 10 of box shape which is integral with the rim 2 of the front piece 1.

The nose 10, at the end of the half-backs facing away from the rim 2 forms a shoulder 14 which acts as stop upon the opening of the temple piece 13.

It will thus be seen that the objects set forth above, among those made apparent from the preceding description, are efficiently attained and, since certain changes may be made in the above constructions without departing from the spirit and scope of the invention, it is intended that all matter contained in the above description, or shown in the accompanying drawings, shall be interpreted as illustrative and not in a limiting sense.

It is also to be understood that the following claims are intended to cover all of the generic and specific features of the invention herein described, and all statements of the scope of the invention which, as a matter language, might be said to fall therebetween.

We claim:

1. A method of manufacturing front pieces for eyegalss frames, characterized by the fact that it comprises the following steps:
    a. cutting from a strip of semi-finished product comprising a front piece with lens-bearing rims which are provided on the outermost part of each of them with an appendage integral with the corresponding rim and extending outward therefrom, said rims and corresponding appendages being symmetrical with respect to a central transverse axis of the front piece and the appendages being aligned opposite each other on a longitudinal axis of the front piece,
    b. bending each appendage along lines parallel to the longitudinal axis of the front piece to form a pair of spaced cheeks which are substantially parallel and extend in the same direction at right angles from the plane of the front piece, and
    c. bending each appendage along a line substantially parallel to the transverse axis of the front piece so as to form a box-shaped body constituting a nose of the eyeglasses.

2. A method according to claim 1, characterized by the fact that each of said appendages is slit by a central cut substantially parallel to said longitudinal axis and including the corresponding rim.

3. A method according to claim 1, characterized by the fact that each of said appendages comprises a widened portion spaced from and integral with the corresponding rim by means of a bridge portion.

4. A method of manufacturing front pieces for eyeglass frames, characterized by the fact that it comprises the following steps:
    a. cutting from a strip a semi-finished product comprising a front piece with lens-bearing rims which are provided on the outermost part of each of them with an appendage integral with the corresponding rim and extending outward therefrom, said rims and corresponding appendages being symmetrical with respect to a central transverse axis of the front piece and the appendages being aligned opposite each other on a longitudinal axis of the front piece,
    b. drilling holes in said appendages near one or more corners thereof,
    c. cutting each appendage by a substantially central cut parallel to the longitudinal axis of the front piece and including the corresponding rim and subdividing each appendage into two portions,
    d. bending each portion along a line substantially parallel to the longitudinal axis of the front piece so as to cause the bent portions to face each other and parallel, extending at a right angle from the plane of the front piece, and
    e. again bending said appendages in the same direction at a right angle to the plane of the front piece along a line substantially parallel to said transverse axis so as to form from each appendage a corresponding box-shaped body, each defining a nose of the eyepiece.

* * * * *